Feb. 24, 1953  S. W. GRINNAN  2,629,572
AIRCRAFT DISTRESS SIGNAL
Filed July 13, 1948  2 SHEETS—SHEET 1
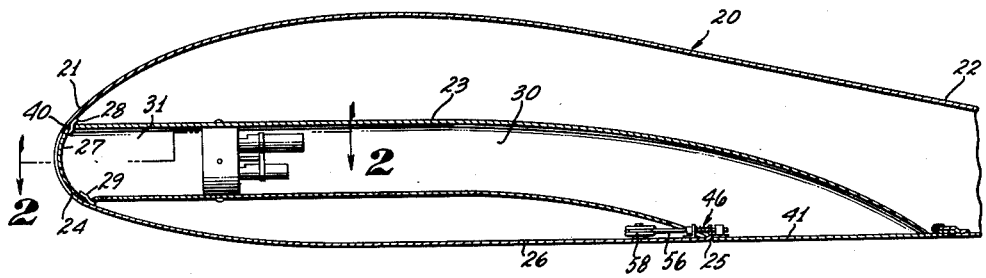
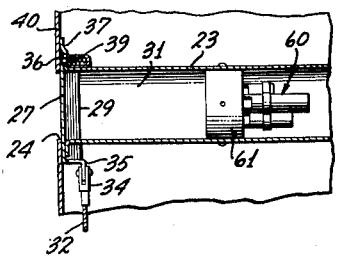
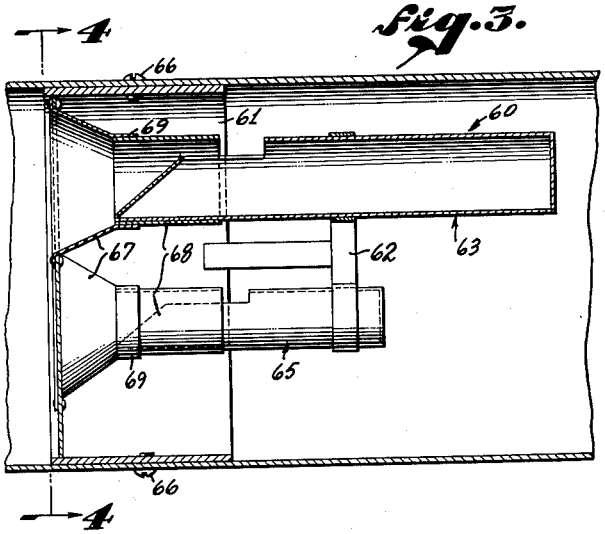
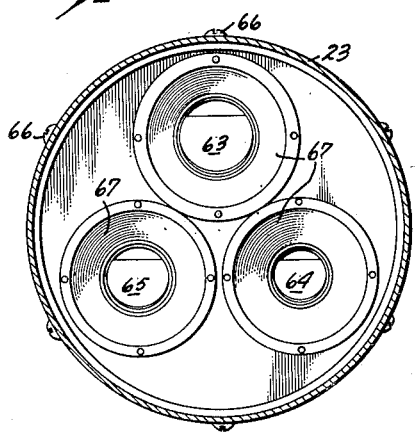
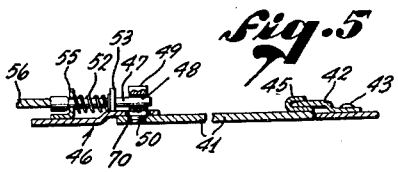
INVENTOR:
SAMUEL WOOD GRINNAN
BY Huebner, Maltby, and Beehler,
ATTORNEYS.

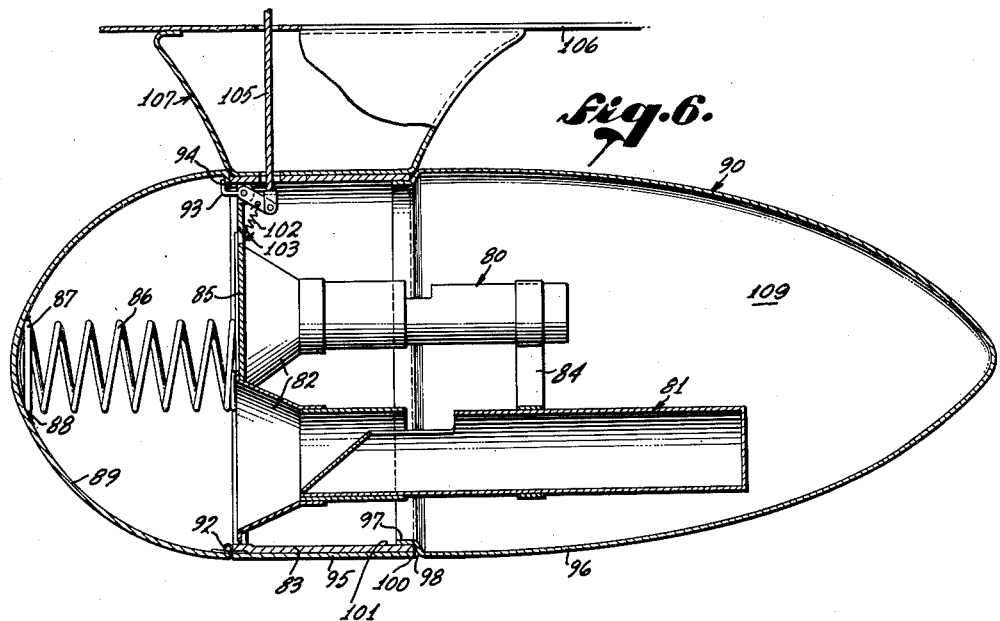

Patented Feb. 24, 1953

2,629,572

UNITED STATES PATENT OFFICE 2,629,572

AIRCRAFT DISTRESS SIGNAL

Samuel Wood Grinnan, Los Angeles, Calif.

Application July 13, 1948, Serial No. 38,455

5 Claims. (Cl. 244—117)

This invention relates to aircraft signaling devices and more particularly to a new and improved form of audible distress signal for aircraft applicable to aircraft as originally constructed or to old aircraft as an auxiliary or accessory.

Small, medium or large aircraft, with or without radio, when in trouble and in need of an immediate landing, can and will with this audible distress signal warn people of their approach. Such craft often must prepare for an emergency landing in a ball park, golf course, play field or even try to edge into an airport between the take-offs and landings of other aircraft. With the aircraft distress signal, people can be warned and give way for a safer approach for pilot, crew and passengers. Furthermore, the pilot can pay primary attention to the handling of his craft and need pay less to the congested or crowded park, golf course, etc., upon which he needs to land. Many cases are on record where pilot, crew and passengers have been killed or injured trying to warn or avoid hitting people or animals in or on emergency landing spots selected and which have not been seasonably cleared due to ignorance of the pilot's intention to land.

By the same token, safer landings on busy airports by planes-in-trouble can also be made, as radio contact only warns the radio operator who, in turn, needs to warn other aircraft with radios, whether in the air or on the ground, of the approaching aircraft.

Student pilots are required by the Department of Commerce to make cross-country trips of various distances to be eligible for their pilot's license. Cases are on file where these new pilots have lost their way, ran out of gas, had engine failure, or for some reason had to make an immediate landing. Many times in sparsely settled country, the aircraft distress signals would without doubt be heard by some one who could report the vicinity of these aircraft whether forced down, crashed, or safely landed. Help would be received much faster and lives saved.

It is therefore among the objects of this invention to provide a new and improved audible distress signal which is readily adaptable for use in small or relatively large craft either as an accessory to the completed airplane structure or made integral therewith as during a process of manufacturing such craft.

Another object of the invention is the provision of a new and improved audible distress signal of the desired character described combining compactness and light weight with great adaptability for mounting and effectiveness in use.

It is another further object of the invention to provide a new and improved aircraft distress whistle.

Yet another object of the invention is the provision of a new and improved combined shielding and fairing structure for the signal in question.

A further object of the invention is the provision of an improved release mechanism and means for assuring the proper operation of the signal under any adverse circumstances.

Other specific objects of the invention include novel trap door and extensible devices, novel control means, simple and economical construction capable of economical mass production, and other specific and general improvements over prior art devices heretofore intended to accomplish a similar purpose.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a fragmental sectional view of an airplane wing incorporating a preferred form of this invention.

Figure 2 is a sectional view as on a line 2—2 of Figure 1.

Figure 3 is a side elevational view partly in section of the signal construction illustrated in Figure 1.

Figure 4 is a sectional view taken as on a line 4—4 of Figure 3.

Figure 5 is a detailed view of a trap door and mechanism as shown at the lower right-hand side of Figure 1.

Figure 6 is a sectional view and side elevation of a modified form of mounting.

Figure 7 is a similar view of a still further modified form of the invention.

Referring more particularly to the drawings, there is shown by way of illustration, and not of limitation, an airplane wing 20, or other typical body or wing portion of an aircraft having a forward end 21 and a trailing end fragmentally illustrated at 22. A forwardly extending duct or housing 23 of preferably circular cross-section may terminate in a forward opening 24 in the leading edge 21 of the wing and in a relatively rearward opening 25 as in the underside 26 of the wing.

The foremost opening 24 may be normally closed as by a sliding or other panel 27 confined as within guides 28 and 29 for a sideways sliding movement to open the interior 30 of said duct to the atmosphere at the forward end 31 thereof.

The opening 24 may be of any shape but preferably conforms to the interior form and dimensions of the forward end 31 of the duct 23, the latter, in the event the opening is square or rectangular, being suitably shaped and flared to correspond.

The panel, as may be most clearly seen in Figure 2, may slide sideways to the right of an observer facing the plane (as from the left-hand side of Figure 1) under the influence of a cable 32 secured as by a conventional yoke connection 34 to an ear 35 formed in an end of the panel 27. At its limit of closed movement the opposite panel end 36 may be snugly secured within a flared outer edge 37 of the conduit provided therefor. A spring-urged detent 39 or the like, such as a ball or other suitable means, may be employed for retaining a sufficiently firm but releasable connection between the guides 28 and 29 or other adjacent structure and the panel 27 as will readily occur to anyone skilled in the art of aircraft construction.

The cable 32 may be controllable from the pilot's instrument panel by means of any conventional lever and pulley connection, not shown. The top offset and corresponding slide portions 37 may be secured to the skin 40 as by riveting, spot-welding or the like.

At its rearmost end the housing 23 may be provided with a suitable closure 41 over the opening 25. Said closure is preferably flush with the under surface 26 of the wing or adjacent structure to avoid drag due to air friction and may be secured as by a flange 42 in line with the skin by any appropriate means as rivets 43. A channel-formed member 45 may be employed for the snug but slidable engagement of the flange 42.

A spring latch generally designated at 46 may comprise a pin 47 extensible through an opening 48 in a lug 49 secured as by threads, etc., 50 to said panel 41. A spring 52 confined by shoulder 53 may hold the pin 47 within the lug 49 as by an abutment 55 through which the pin 47 extends until retracted from the opening 48 by a cable or the like 56 under the control of an operator, preferably by lever as aforesaid, upon the instrument panel (not shown). In its path to the control panel, the cable 56 may, as heretofore noted, be passed around any number of pulleys 58 to clear structural and other obstacles.

A whistle 60 or other sounding means, preferably operable by a blast of air due to the moving aircraft when the panels 27 and 41 are opened, in a manner to be explained, may be positioned within a collar 61 and supported therein by any appropriate cross-bracing 62. The sounding means may comprise any number of whistles as 63, 64 and 65, preferably of different shapes, lengths and diameters, in order to produce a variable pitch when sounded together under the influence of the air current flowing therethrough due to their different tonal qualities. The collar 61 may be secured within the housing 23 as by means of bolts 66 or in any other appropriate and conventional manner.

It is preferable, though not essential, in order to increase the volume of sound, to incorporate funnel-shaped members 67 as to annular portions 68 by collars 69. The collars 69 may be secured to the whistle bodies as by welding, riveting, etc.

In the operation of the preferred form of the apparatus hereinabove described, in the event that a plane is in difficulty, the pilot may open the panels 27 and 41 by a control lever in or adjacent the instrument panel or cockpit. Thereby, the panel 27 will be forced to slide between the guides 28 and 29, and the panel 41 will be released and permitted to drop away from the plane, unless hung therefrom as by a cord or optionally hinged thereto. Preferably, however, the pull upon the cable 56 will withdraw the pin 47 from the opening 48 permitting the lug 49 to drop through its opening 70.

The weight of the panel 41 pivoting upon the yoke-shaped member 45 and assisted by the force of the air stream moving from left to right, as illustrated in Figure 5, will cause the withdrawal of the flange 42 therefrom, permitting the panel to peel off or swing loose. Manifestly, a portion of the air stream will pass through the housing 23 and will be channeled through the whistle ducts 67 thereby sounding the whistles and warning the surrounding countryside that the aircraft is in distress.

In a modified form of the apparatus, as illustrated in Figure 6, any number of whistles such as 80 and 81 may be similarly provided with funnels 82 at their forward end and may be mounted within a collar 83 by any supporting means 84. A frame 85 may provide an abutment for a coil spring 86 whose other end 87 may be secured as by welding 88 against a cap 89 formed at the front of the teardrop generally designated by the numeral 90. The cap 89 may be hinged at its bottom edge 92, and may be secured at its upper end by a latch 93, normally engageable as with an inturned ear or portion of the annular flange 94 preferable for supporting and retaining the shape of the cap 89. The periphery of the cap and the skin 95, as well as a tailpiece 96, comprising a teardrop shape 90, are in alignment, thereby collectively presenting a smooth surface. A reduced annulus 97 may define a shoulder 98 for abutment against the skin edge 100 and normally frictionally engages the inner surface 101 or the collar 83 thereby retaining the tailpiece 96 in position as shown. It is obviously desirable in most installations and, especially as strong vibration is encountered, to interpose spring-urged ball bearings and detents in any well-known manner to insure that the tailpiece 96 will not become prematurely disengaged from its lodgement within the collar 83. A spring 102 engageable by an upstruck ear 103 may normally urge the latch 93 in clamping position against the ear 94 subject to release against such tension by a cable 105 under the control of an operator as aforesaid. The teardrop structure 90 may be secured to the skin or framework 106 of an airship by a streamlined boss structure 107 either in a superior position as shown for the underside of a plane or in an inverted position for a top surface thereof.

In the operation of the device of Figure 6, a pull upon the cable 105 by an operator releases the latch 93 from its engagement with the ear 94. The spring 86 being normally under tension, forceably swings the nosepiece or cap 89 forwardly and downwardly upon the hinge 92, or if the hinge 92 is not desired, other latches similar to the latch 93 may be substituted. Thereby, the nosepiece 89 may be bodily ejected and removed from its securement to the airplane, being then permitted to fall away.

The force of air entering the interior 109 of the tailpiece 96 through the funnels 82 and their corresponding whistles will, ordinarily, be sufficiently strong to eject said tailpiece against the tension of any temporary detents although, if desired, it is contemplated that another spring, such as 86, and corresponding latch construction associated with the nosepiece, may be secured to the tailpiece to eject the same in a similar manner.

The further modified form of Figure 7 may comprise a locking hydraulic cylinder 120 secured to a hydraulic control mechanism under the control of a pilot (not shown), as by means of an appropriate conduit 121 and conventional control similar to that used for retraction of landing gear. Actuation of the piston operatively extends the whistle structure generally designated at 122 and comprising whistles 123, 124, etc., by causing alignment of the links 125 and 126. As shown, the whistle and its housing 127 will then project downwardly as indicated in broken outline 128 in said figure through an opening 129 formed in the body and skin 130 of a portion of the ship's structure as the wing or body. The links 125 and 126 may be secured as by pintles 131 to brackets 132 and 133, these latter being secured as to adjacent ship's supporting structure 130 and the housing 127, respectively. Said housing may be held against stops 135 formed in portions of the frame or ribs 136, 137 in order to secure their firm positioning in a desired and steady location adjacent the opening 129. Thereby, its lowermost portion 138 may be flush with the remaining skin of the ship 130. Other portions of the horn structure, being optionally similar to that of the two preceding embodiments described, are designated by corresponding numerals to the other embodiment (Figure 6).

It is preferable, as providing a more substantial construction, to provide appropriately shaped channels 140 in corresponding ribs 136, 137, etc., as upon opposite sides or at points around the housing 127, as needed, in which runners 142 may be guided. Leaf springs 145 or other shock-absorbing and anti-vibrating devices may be employed as known to those skilled in the art in order to prevent vibration of the sound assembly during flight.

It will be understood that all of the parts of the instant device, including the whistles, may be made of the lightest form of metal, such as aluminum and magnesium, and that it is intended to keep the weight of the apparatus as low as possible consistent with good performance and the need for compactness.

The invention features a lightweight whistle construction which during normal use may be feathered or retained within a suitably faired housing, as witness the embodiment of Figure 6, or within the framework and main body of the plane itself as illustrated, for example, in Figures 1 through 5, and 7. These latter two embodiments are to be preferred in the original construction of the aircraft and are most suitable in aircrafts of larger construction although they may also be employed in the lighter forms of aircraft. The form of Figure 6, however, is believed to be most suitable as a prefabricated unit for small types of craft or for crafts which have been completed and to which the signaling unit may be added as an accessory.

Although the invention has been herein shown and described in what is conceived to be the most practical and preferred embodiment, it is recognized that departures may be made therefrom within the scope of the invention which is not to be limited to the details disclosed herein but is to be accorded the full scope of the claims so as to embrace any and all equivalent structures.

The invention having been herein described, what I claim as new and desire to secure by Letters Patent is:

1. An audible distress signal device for aircraft comprising sound maker means, said device including a housing having fore and aft openings, said housing including a shielding means normally shielding and fairing said sound maker and said openings from an air stream surrounding the aircraft, and control means actuatable to expose the sound maker to the air stream for sounding the same by the substantially simultaneous unshielding of the fore and aft openings to permit the passage of the air through said openings, said shielding means together with said housing defining a dewdrop shaped structure standing out from the main body of the aircraft, the shielding means for the fore opening being releasably secured to the foremost portion of the housing, and tension means releasable by said control means for removing said shielding means from said fore opening, said shielding means for the aft opening being automatically releasable and being frictionally secured to and removable from the rearmost portion of the housing under the influence of said air stream when said fore shielding means has been removed.

2. In an audible distress signal device for aircraft comprising a cylindrical housing having front and rear openings and an air-actuated noise-maker permanently secured in the housing, a connection means adapted to hold the housing extended from an aircraft and axially into the aircraft air stream, cover means for the front and rear ends of the housing, and latch means actuatable by an operator to uncover the housing whereby said noise-maker is actuated by the air stream.

3. In an audible distress signal device for aircraft, said device comprising a cylindrical housing having front and rear openings and an air-actuated noise-maker permanently secured in the housing, a connection means adapted to hold the housing extended from an aircraft and axially into the aircraft air stream, cover means for the front and rear ends of the housing, and latch means actuatable by an operator to uncover the housing whereby said noise-maker is actuated by the air stream, the cover means, with said housing, defining a streamlined dewdrop casing, said casing having an abutment therein in front of said noise-maker, a spring normally under tension disposed between the cover means for the front of the housing and said abutment urging said front cover means away from said housing with sufficient force to overcome head-on air pressure of the air stream, said front cover means being forcibly opened by said spring when said latch means is released.

4. In an audible distress signal device for aircraft, said device comprising a cylindrical housing having front and rear openings and an air-actuated noise-maker permanently secured in the housing, a connection means adapted to hold the housing extended from an aircraft and axially into the aircraft air stream, cover means for the front and rear ends of the housing, and latch means actuatable by an operator to uncover the housing whereby said noise-maker is actuated by the air stream, said rear cover having a press-fit engagement with the rear end of the housing and being releasable therefrom by direct air pressure coming through said housing whereby said rear cover is blown off.

5. In an audible distress signal device, for aircraft, said device comprising a cylindrical housing having front and rear openings and an air-actuated noise-maker permanently secured in the housing, a connection means adapted to hold the housing extended from an aircraft and axially into the aircraft air stream, cover means for the front and rear ends of the housing, and latch means actuatable by an operator to uncover the housing whereby said noise-maker is actuated by the air stream, the cover means, with said housing, defining a streamlined dewdrop casing, said casing having an abutment therein in front of said noisemaker, a spring normally under tension disposed between the cover means for the front of the housing and said abutment urging said front cover means away from said housing with sufficient force to overcome head-on pressure of the air stream, said front cover means being forcibly opened by said spring when said latch means is released, said rear cover having a press-fit engagement with the rear end of the housing and being releasable therefrom by direct air pressure coming through said housing whereby said rear cover is blown off.

SAMUEL WOOD GRINNAN.

REFERENCES CITED

The following references are of record in the file of this patent:

UNITED STATES PATENTS

| Number | Name | Date |
|---|---|---|
| 1,559,091 | Hall | Oct. 27, 1925 |
| 1,766,914 | Lemieux | June 24, 1930 |
| 1,781,266 | Bruni | Nov. 11, 1930 |
| 2,152,053 | Jenkins | Mar. 28, 1939 |
| 2,392,394 | Lear | Jan. 8, 1946 |
| 2,409,131 | Lear | Oct. 8, 1946 |
| 2,432,078 | Adler | Dec. 9, 1947 |